F. L. WALTER.
ROTARY SCREEN AND SEPARATOR.
APPLICATION FILED DEC. 14, 1912.
1,088,117.
Patented Feb. 24, 1914
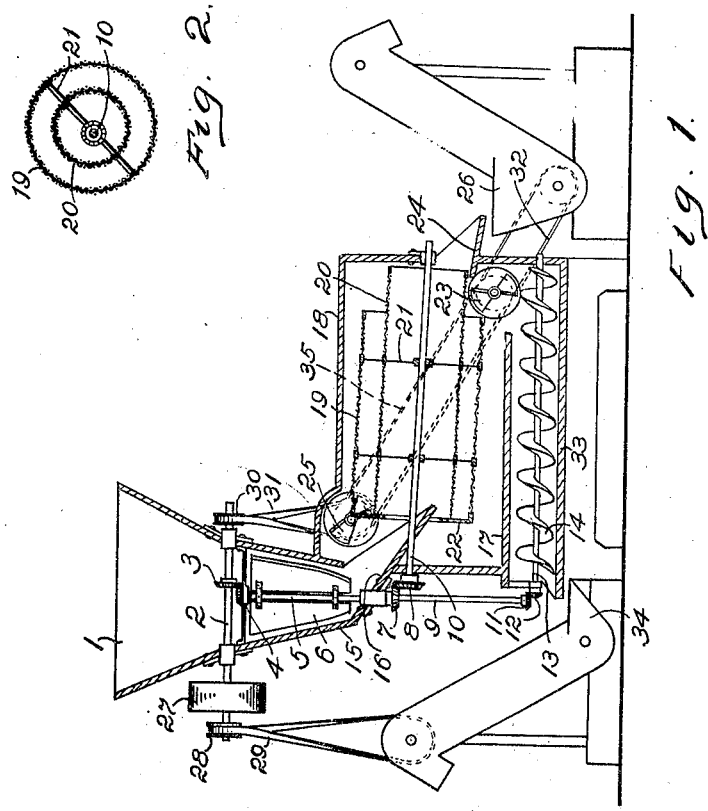
WITNESSES
INVENTOR
F. L. Walter
by G. C. Kennedy,
ATTORNEY

UNITED STATES PATENT OFFICE.

FRANK L. WALTER, OF WATERLOO, IOWA, ASSIGNOR TO WILLIAM WALTER, OF WATERLOO, IOWA.

ROTARY SCREEN AND SEPARATOR.

1,088,117.     Specification of Letters Patent.     Patented Feb. 24, 1914.

Application filed December 14, 1912. Serial No. 736,753.

*To all whom it may concern:*

Be it known that I, FRANK L. WALTER, a citizen of the United States of America, and a resident of Waterloo, Blackhawk county, Iowa, have invented certain new and useful Improvements in Rotary Screens and Separators, of which the following is a specification.

My invention relates to improvements in corn shellers, and the object of my improvement is to more efficiently remove the corn kernels from the cobs, break up the latter, separate each from the other, screen and deliver the various parts of the mixture to designated localities or into receptacles therefor. This object I have accomplished by the mechanism which is hereinafter described and claimed, and which is illustrated in the accompanying drawings, in which:

Figure 1 is a vertical longitudinal section through my said improved corn sheller except the oppositely-located corn and cob conveyers which are represented in elevation. Fig. 2 is a vertical transverse section through the double-cylinder netted screen, looking toward the delivery end thereof.

Similar numerals of reference denote corresponding parts throughout the several views.

My improved machine is supported on a suitable base and has its screening- and winnowing-mechanism inclosed in a hollow casing 18. At one end, hereafter designated as the forward end of said casing is a communicating hopper 1 of frustal shape leading into an intermediate lesser frustal mill-casing 15, the latter having an open-top chute 16 delivering into the interior of the casing 18. A vertical rotary shaft 5 is seated centrally within the mill-casing 15, and the inner walls of the latter may have rugosities to engage ears of corn although such rugosities are not here shown. Within the casing 15 are a plurality of vertical vanes 6 attached to the shaft 5 and each bent forwardly somewhat in a spiral or helical manner at their lower ends. The outer edges of said vanes approach the inner walls of said mill-casing somewhat closely. On the top of said shaft 5 is a bevel-gear 4 driven by a bevel-pinion 3 on a horizontal shaft 2, the latter being seated across the lower part of the hopper 1 in bearings in the walls thereof and projecting outwardly at both ends.

One end of the shaft 2 has a belt-wheel 27 mounted thereon which serves as a means for communicating power to the machine from some source of power not shown. On the extreme forward end of said shaft is a smaller pulley 28 driving a belt 29, which latter is adapted to actuate proper mechanism not shown driving a belt conveyer located in a casing 34. On the other end of the shaft 2 is mounted a small pulley 30 carrying a belt 31 adapted to drive a pulley on the shaft of a fan-wheel 25 seated in an opening in the casing 18. Another belt 35 driven by another pulley not shown on the shaft of said fan-wheel actuates a pulley on a shaft which rotates a fan-wheel 23 also seated in an opening in the casing 18, but located at the lower rear part of the casing on one side. A belt 32 driven by a pulley not shown on the shaft of the last-mentioned fan-wheel drives a pulley which actuates a conveyer-belt in a casing 26 at the rear end of the machine.

On the lower end of the shaft 5 is a bevel-pinion 11 which drives a bevel-gear 12 on the forward end of a horizontal longitudinal shaft 13 which is located in a chamber under a partition 17 at the base of said casing 18. Upon said shaft 13 is a conveyer in the form of an Archimedian screw whose rear receiving end is under an opening in the partition 17 and under the rear delivery end of the double netted drum 19—20. The latter drum is formed of concentric cylinders of wire netting 19 and 20, of which the inner cylinder 20 extends to the rear beyond the outer cylinder 19. These drums are fixedly mounted eccentrically on an inclined rotary shaft 10 on spider-arms within the drums spaced from the ends thereof. The space between the two cylinders at their forward ends is closed by a solid head to prevent regurgitation of the substances emptied into the inner cylinder by the delivery chute 16 which extends into the hollow of said cylinder, and said solid head projects inwardly somewhat to form an inwardly-directed flange for the forward end of the inner cylinder for a like purpose. The shaft 10 is rotated by means of a bevel-gear 8 thereon meshed with a bevel-pinion 7 on the upright shaft 5. The rear end of the cylinder 20 closely approaches the rear wall of the casing 18 to deliver through an opening in said wall into a chute 24, the latter delivering into a hopper to the conveyer in the casing 26. The delivery-ends of the conveyers 34 and 26 are located at opposite ends of said machine, at a convenient height, and adapted to deliver into any receptacle or carrier.

Operation of the machine: Ears of corn which are dumped into the hopper 1 are carried down past the rotating vanes 6 which grasp and rub them forcibly against the inner walls of the casing 15 and against each other, and since the casing diminishes in width downwardly the ears are broken into pieces so that a mingled mass of shelled kernels, cob fragments and chaff is received by the chute 16. The fan-wheel 25 over and near the forward end of the double-drums 19—20 sucks in the chaff and carries it without the machine whence it may be received in sacks or otherwise. The cob fragments and shelled corn enter the inner drum 20. Since these drums 19—20 are eccentrically mounted on the shaft 10, as shown best in the Fig. 2, the drums while rotating receive an agitation which serves to keep the cob fragments and kernels in movement in all ways while generally progressing downwardly toward the delivery end of the inner drum. The kernels of corn are thus all shaken through the interstices of the nettings of the drums, while the larger and lighter cob fragments move out of the inner drum to be received in the chute 24, and thence carried through the hopper and conveyer 26 to a receptacle. Small fragments of the cobs which may have succeeded in passing the meshes of the drums are sucked up by the fan-wheel 23 and carried out of the casing 18. Kernels which pass the drums are received on the partition 17 whence they slide and are pushed down through the opening at the rear thereof into the receiving end of the screw-conveyer 14 which carries them to the hopper of the conveyer 34, and the latter elevates them and delivers them into some receptacle.

It will be seen that the whole mechanism works harmoniously and automatically together to perform the said associated and integrated functions, and that the operation is effective and rapid, as well as complete in the cycles of coacting performances.

Having described my invention, what I claim as new, and desire to secure by Letters Patent, is:

A separator, comprising a rotary sieve composed of connected concentric hollow intersticed cylinders, mounted on a rotary shaft, means for delivering unseparated fragments of materials of different sizes into the inner cylinder only, means for separating the delivery-end of the inner cylinder from the delivery-end of the outer cylinder, a rotary-fan adapted to create a suction in the vicinity of the inlet-ends of said cylinders to draw off light chaffy particles of said materials, another rotary-fan located in the vicinity of the delivery-ends of said drums and adapted to create a suction to aid in propelling the largest particles of the material out of the inner drum, a movable conveyer adapted to receive only from the delivery-end of the inner drum, another movable conveyer adapted to receive from the periphery and delivery-end of said outer drum only, a third movable conveyer adapted to receive from the delivery-end of said second conveyer only, and driving-means connected with all said moving parts adapted to actuate them all at the same determined rates of speed coöperatively.

Signed at Waterloo, Iowa, this 27th day of Nov. 1912.

FRANK L. WALTER.

Witnesses:
W. H. BRUNN,
GEO. C. KENNEDY.